United States Patent
Sakai

(10) Patent No.: US 8,693,411 B2
(45) Date of Patent: Apr. 8, 2014

(54) COMMUNICATION APPARATUS AND COMMUNICATION METHOD THEREFOR

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 12/666,277

(22) PCT Filed: Aug. 22, 2008

(86) PCT No.: PCT/JP2008/065473
§ 371 (c)(1),
(2), (4) Date: Dec. 22, 2009

(87) PCT Pub. No.: WO2009/028635
PCT Pub. Date: Mar. 5, 2009

(65) Prior Publication Data
US 2010/0322164 A1 Dec. 23, 2010

(30) Foreign Application Priority Data
Aug. 27, 2007 (JP) .................................. 2007-219921

(51) Int. Cl.
*H04W 4/00* (2009.01)
(52) U.S. Cl.
USPC ............ 370/329; 370/310; 370/315; 370/328
(58) Field of Classification Search
None
See application file for complete search history.

(56) References Cited

U.S. PATENT DOCUMENTS

| 7,174,157 | B2  |  2/2007 | Gassho et al. ................ 455/410 |
| 7,471,662 | B2* | 12/2008 | Otsuka .......................... 370/338 |
| 7,697,516 | B2* |  4/2010 | Frei et al. ..................... 370/389 |
| 7,697,932 | B2* |  4/2010 | Nakajima ................. 455/435.1 |

(Continued)

FOREIGN PATENT DOCUMENTS

| JP | 2003-152735 | 5/2003  |
| JP | 2003-338821 | 11/2003 |

(Continued)

OTHER PUBLICATIONS

International Search Report mailed Jan. 14, 2009 in International Application No. PCT/JP2008/065473 corresponding to the above U.S. application.

(Continued)

*Primary Examiner* — Hassan Phillips
*Assistant Examiner* — Gautam Sharma
(74) *Attorney, Agent, or Firm* — Fitzpatrick, Cella, Harper & Scinto

(57) ABSTRACT

In order to make it possible for a communication apparatus to readily detect a provider of communication parameters, the provider of communication parameters creates a network for which a network identifier that is unique among networks in the vicinity has been set, and provides a receiver, which has joined this network and requests receipt of communication parameters, with these communication parameters.

8 Claims, 6 Drawing Sheets

(56) References Cited

U.S. PATENT DOCUMENTS

| | | | |
|---|---|---|---|
| 2002/0061748 A1* | 5/2002 | Nakakita et al. | 455/435 |
| 2002/0147819 A1* | 10/2002 | Miyakoshi et al. | 709/228 |
| 2003/0003912 A1* | 1/2003 | Melpignano et al. | 455/436 |
| 2003/0115339 A1* | 6/2003 | Hodoshima | 709/228 |
| 2004/0133689 A1* | 7/2004 | Vasisht | 709/228 |
| 2004/0240412 A1* | 12/2004 | Winget | 370/331 |
| 2004/0240474 A1* | 12/2004 | Fan | 370/475 |
| 2004/0266435 A1* | 12/2004 | de Jong et al. | 455/436 |
| 2005/0090259 A1* | 4/2005 | Jain et al. | 455/439 |
| 2006/0023651 A1* | 2/2006 | Tsuchiuchi et al. | 370/310 |
| 2007/0073914 A1 | 3/2007 | Yoshida | 710/10 |
| 2007/0195729 A1* | 8/2007 | Li et al. | 370/328 |
| 2008/0037444 A1* | 2/2008 | Chhabra | 370/254 |
| 2008/0198823 A1* | 8/2008 | Shiu et al. | 370/338 |

FOREIGN PATENT DOCUMENTS

| | | |
|---|---|---|
| JP | 2007-81730 | 3/2007 |
| JP | 2007-143117 | 6/2007 |
| WO | 2005/032072 | 4/2005 |
| WO | 2009/014014 | 1/2009 |

OTHER PUBLICATIONS

U.S. Appl. No. 12/599,973, filed Nov. 12, 2009, Inventor: Tatsuhiko Sakai.

* cited by examiner

COMMUNICATION APPARATUS AND COMMUNICATION METHOD THEREFOR

TECHNICAL FIELD

The present invention relates to a communication apparatus and a communication method therefor.

BACKGROUND ART

In wireless communication represented by a wireless LAN complying with the IEEE802.11 standard series, there are many setting items to be set in advance. The setting items include communication parameters necessary for wireless communication, such as an SSID (Service Set IDentifier) as a network identifier, an encryption method, an encryption key, an authentication method, and an authentication key. It is very troublesome for a user to set them by manual input.

Various manufacturers have proposed automatic setting methods for easily setting communication parameters in a wireless apparatus. In those automatic setting methods, one apparatus provides another apparatus with communication parameters using a procedure predetermined between these connected apparatuses and a message, thereby automatically setting the communication parameters.

As for the communication parameter automatic setting method, each manufacturer often employs its proprietary method. Procedures for setting communication parameters or interpretable messages are different between apparatuses which do not support a common communication parameter automatic setting method. In this case, it is impossible to set communication parameters using the automatic setting method. On the other hand, between apparatuses which support a common communication parameter automatic setting method, it is possible to easily set communication parameters using the automatic setting method.

Japanese Patent Laid-Open No. 2003-338821 has disclosed an example of communication parameter automatic setting.

A communication parameter automatic setting method requires a role of "provider" which provides another wireless apparatus with communication parameters and a role of "acceptor" which receives the communication parameters provided by the provider and sets them in the acceptor itself.

Therefore, when a wireless apparatus needs to receive communication parameters by automatic setting, it must search for a provider that can provide those communication parameters.

However, since the provider does not necessarily respond to a signal for searching for a provider, it is impossible to easily search for a provider of the communication parameters.

In an ad-hoc network (IBSS: Independent Basic Service Set) complying with the IEEE802.11 standard, a station which has transmitted a beacon last returns a response to a probe request as a search request signal. This means even if a given apparatus transmits a probe request to search for a provider, an apparatus other than the provider may respond. It is therefore difficult to find a provider of the communication parameters. A problem which results is that processing for setting communication parameters cannot be executed.

DISCLOSURE OF INVENTION

According to one aspect of the present invention, a communication apparatus comprises: a setting means which executes processing for setting communication parameters with another communication apparatus; a determination means which determines a network identifier that is unique among networks in the vicinity; and a creating means which, when the processing for setting communication parameters with another communication apparatus is executed by said setting means, creates a network having the network identifier determined by said determination means as being unique among networks in the vicinity.

According to another aspect of the present invention, a communication method in a communication apparatus, said method comprises the steps of: determining a network identifier that is unique among networks in the vicinity; and creating a network having the network identifier determined as being unique among networks in the vicinity when the processing for setting communication parameters with another communication apparatus is executed.

In accordance with the present invention, processing for setting communication parameters can be executed with ease even in the case of a network on which it is difficult to specify a provider.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

<First Embodiment>

A wireless communication apparatus according to the present invention will be described in detail below with reference to the accompanying drawings. Although a case in which a wireless LAN system complying with the IEEE802.11 standard series is used will be explained blow, a communication method is not necessarily limited to a wireless LAN.

A hardware configuration in the preferred embodiment will be described.

Figure 1:
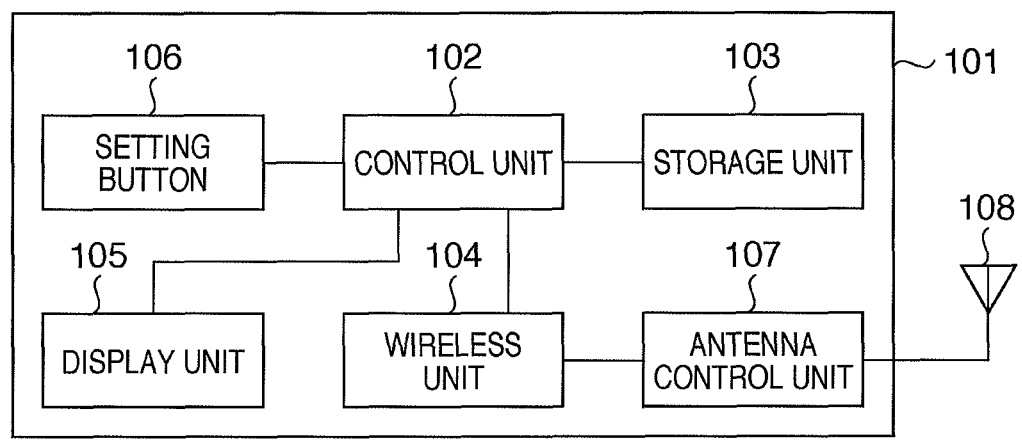
FIG. 1 is a block diagram illustrating the configuration of a terminal.

FIG. 1 is a block diagram showing a configuration of each terminal (to be described later) according to embodiments to which the present invention is applicable. Reference numeral 101 denotes a terminal as a whole; and 102, a control unit which controls the terminal as a whole by executing control programs stored in a storage unit 103. The control unit 102 also controls communication parameter setting with another terminal. The storage unit 103 stores the control programs executed by the control unit 102 and various pieces of information such as communication parameters. Various operations (to be described later) are performed when the control unit 102 executes the control programs stored in the storage unit 103. Reference numeral 104 denotes a wireless unit for wireless communication; 105, a display unit which provides various displays and has a function capable of outputting visually perceivable information like an LCD (Liquid Crystal Display) or LED (Light Emitting Diode), or a function capable of outputting a sound like a loudspeaker; and 106, a setting button which triggers a start of the communication parameter setting. The control unit 102 starts a communication parameter setting operation (to be described later) by detecting a user operation of the setting button 106. Reference numeral 107 denotes an antenna control unit; and 108, an antenna.

Figure 2:
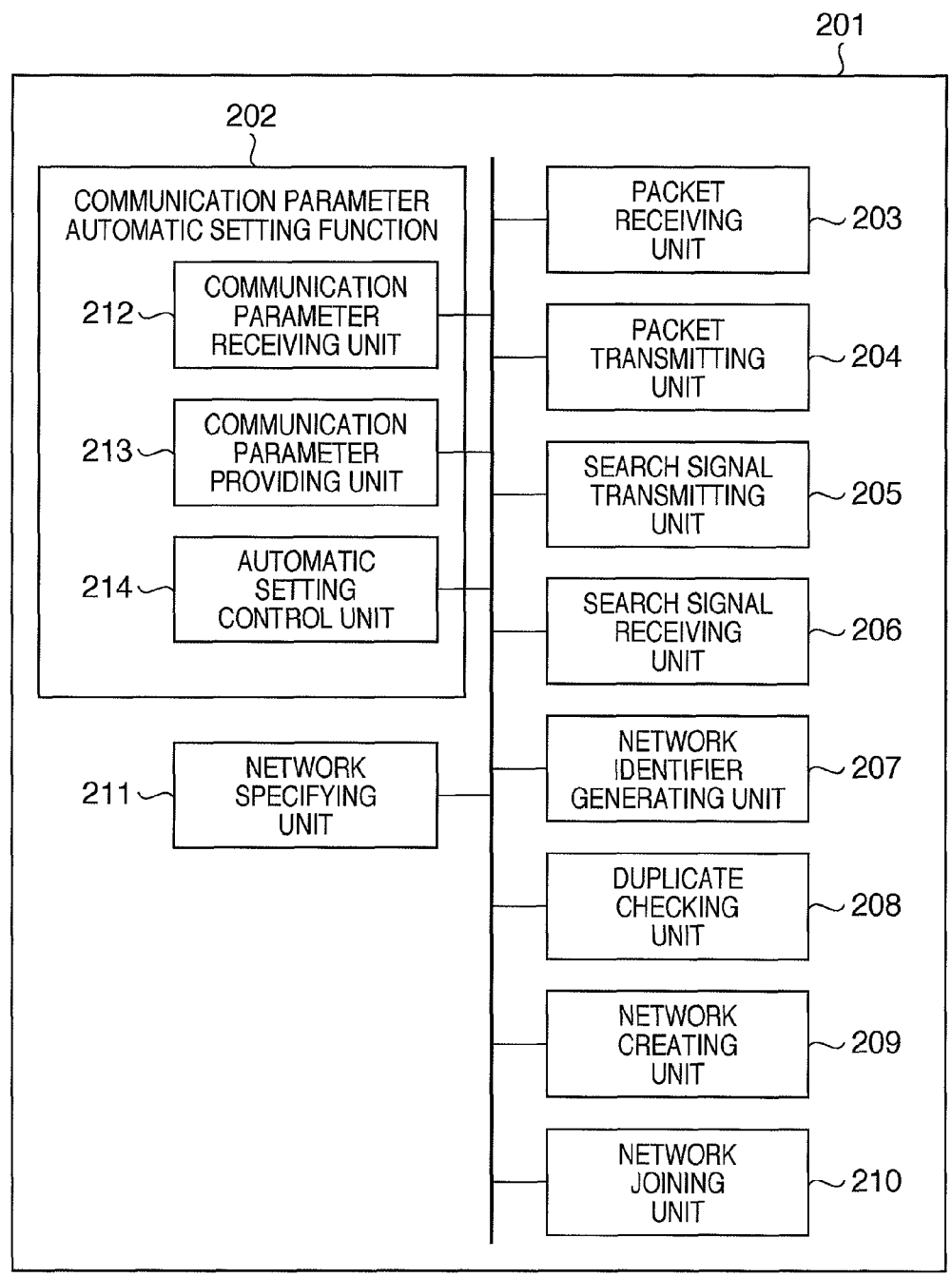
FIG. 2 is a block diagram of software functions within a terminal according to an embodiment of the present invention.

FIG. 2 is a block diagram showing a configuration of software functional blocks executed by each terminal (to be described later) according to this embodiment.

Reference numeral 201 denotes a terminal as a whole; and 202, a communication parameter automatic setting function. In this embodiment, communication parameters necessary for wireless communication, such as an SSID as a network identifier, an encryption method, an encryption key, an authentication method, and an authentication key are automatically set. Reference numeral 203 denotes a packet receiving unit which receives packets associated with various communications; 204, a packet transmitting unit which transmits packets associated with various communications; and 205, a search signal transmitting unit which controls transmission of apparatus search signals such as a Probe_Request signal. It should be noted that a Probe_Request signal can also be referred to as a network search signal for searching for a desired network. Transmission of a Probe_Request signal, described later, is performed by the search signal transmitting unit 205. Further, transmission of a Probe_Response signal, which is a signal that is in response to the received Probe_Request signal, also is performed by the search signal transmitting unit 205.

Reference numeral 206 denotes a search signal receiving unit which controls reception of apparatus search signals such as a Probe_Request signal from another terminal. The search signal receiving unit 206 executes reception processing of a Probe_Response signal (to be described later). Further, reception of the Probe_Response signal also is performed by the search signal receiving unit 206. The Probe_Response signal is a response signal to the Probe_Request signal, and various pieces of information (self-information) on an apparatus that transmitted the Probe_Response signal are added to the Probe_Response signal.

A network identifier generating unit 207 generates a network identifier. Generation of the network identifier, described later, is performed by the network identifier generating unit 207.

Reference numeral 208 denotes a duplicate checking unit 208 for checking to determine whether the network identifier generated by the network identifier generating unit 207 duplicates that of a network existing in the vicinity. Using the search signal transmitting unit 205, the duplicate checking unit 208 broadcasts the Probe_Request signal containing the generated network identifier to the surroundings and inquires as to whether a network having this network identifier exists. When the Probe_Response signal that is in response to this Probe_Request signal is received by the search signal receiving unit 206, the content of this Probe_Response signal is checked. Whether the network having the network identifier generated by the network identifier generating unit 207 exists or not is determined by the result of the check. Further, if the Probe_Response signal is not received by the search signal receiving unit 206, then a determination is rendered to the effect that the network having the network identifier generated by the network identifier generating unit 207 does not exist.

A network creating unit 209 creates a network. Creation of a network, described later, is performed by the network creating unit 209. A network joining unit 210 joins in a network. Joining in a network, described later, is performed by the network joining unit 210. In processing for automatically setting communication parameters, a network specifying unit 211 specifies a network in which an opposing terminal is participating. Specification of a network, described later, is performed by the network specifying unit 211.

The function block that automatically sets communication parameters includes a communication parameter receiving unit 212 for receiving communication parameters sent from a provider of communication parameters; a communication parameter providing unit 213 for providing communication parameters to a device of another party in a case where the apparatus functions as a provider of communication parameters; and an automatic setting control unit 214 for controlling various protocols in automatic setting of communication parameters. Processing for automatically setting communication parameters, described later, is executed by the communication parameter receiving unit 212 and communication parameter providing unit 213 based upon control by the automatic setting control unit 214.

It should be noted that all of the function blocks are interrelated in terms of software or hardware. Further, the above-mentioned function blocks are examples, and it may be so arranged that a plurality of function blocks construct a single function block, and any function block may be broken down further into blocks that perform a plurality of functions.

Figure 3:
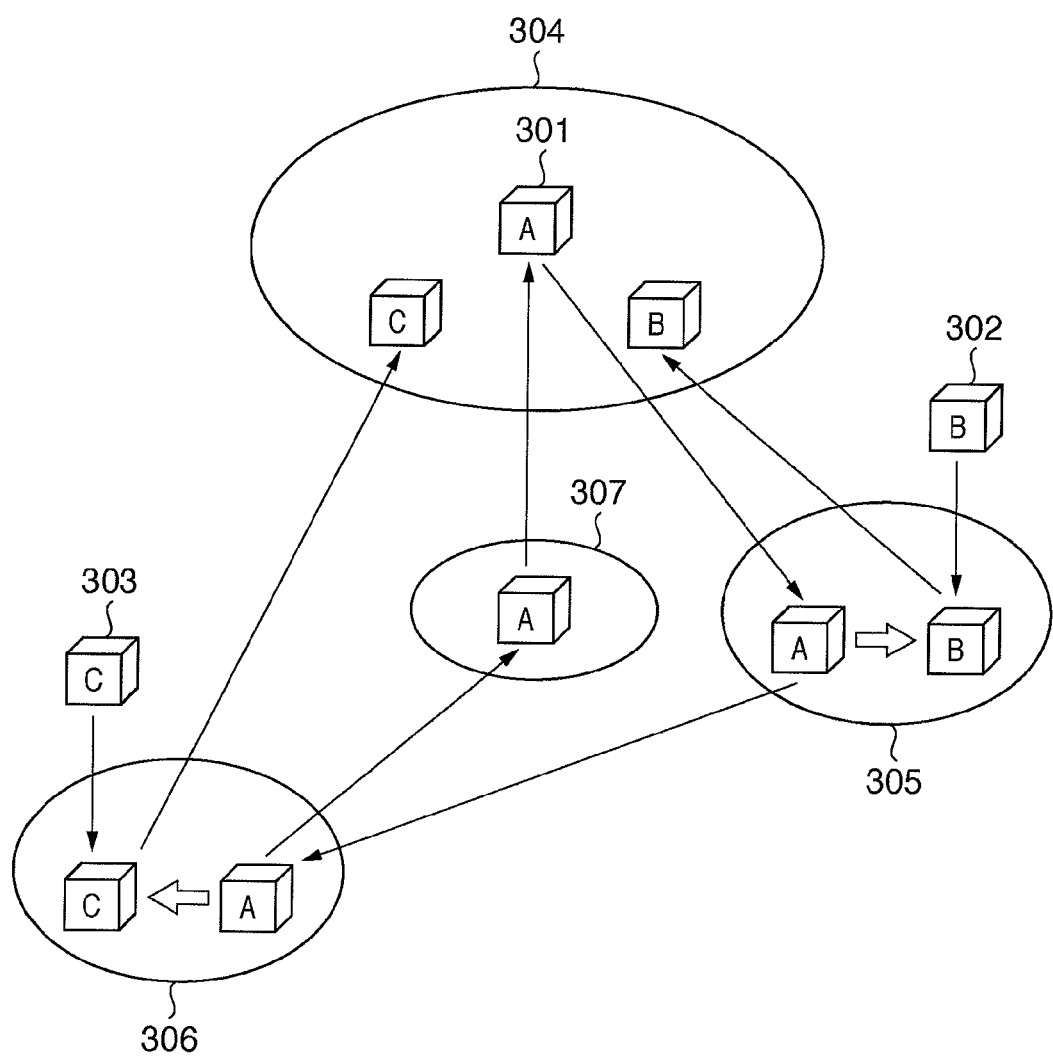
FIG. 3 is a configuration diagram in a case where an ad-hoc network is formed by three terminals in an embodiment.

FIG. 3 is a diagram illustrating a terminal 301 ("terminal A" below), a terminal 302 ("terminal B" below), a terminal 303 ("terminal C" below) and a shared network 304 constructed by the terminals A, B and C. Also illustrated in FIG. 3 are a first network 305 constructed by the terminals A and B, a second network 306 constructed by the terminals A and C, and a third network 307 constructed by terminal A.

Each terminal is equipped with a wireless LAN communication function compliant with IEEE 802.11, performs wireless communication by wireless LAN ad-hoc communication ("ad-hoc communication" below) and is configured as illustrated in FIGS. 1 and 2 described earlier.

Considered in FIG. 3 is a situation in which the shared network 304 has been set up by terminal A and is joined by terminals B and C by the automatic setting of communication parameters.

Terminal A is the provider of communication parameters and provides terminals B and C with communication parameters needed in order to join the shared network 304. In this case terminals B and C are the receivers of communication parameters.

Figure 4:
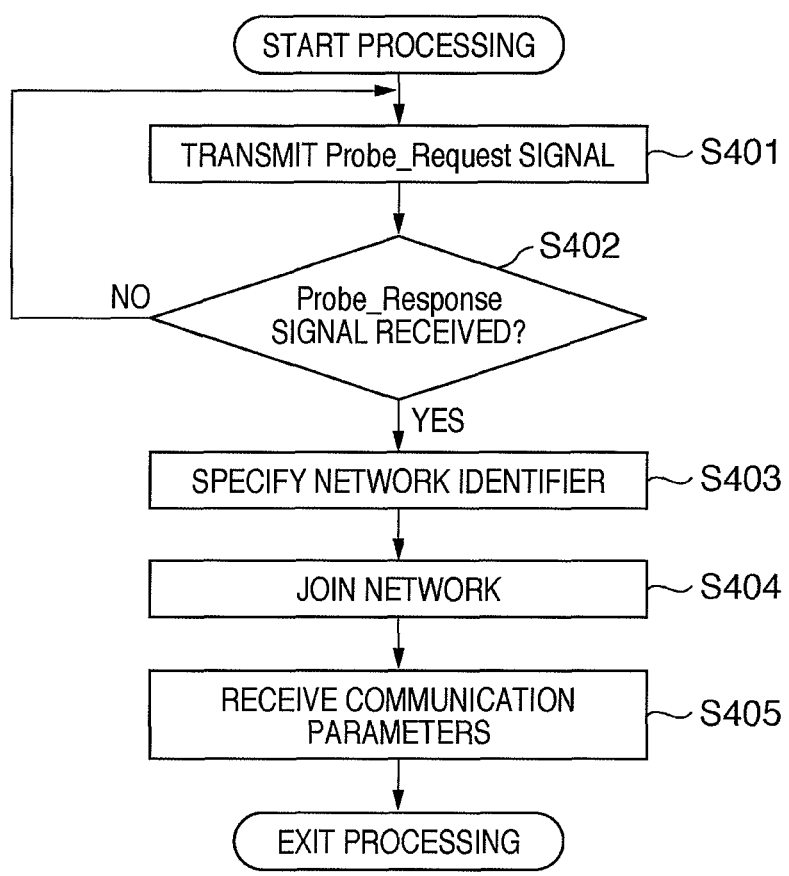
FIG. 4 is a flowchart illustrating operation of a communication-parameter receiver in an embodiment.

FIG. 4 is an operation flowchart for describing processing executed when a receiver of communication parameters receives communication parameters from a provider of communication parameters by processing for automatic setting of communication parameters. In the description that follows, the receiver of communication parameters shall be referred to as a "receiver", and the provider of communication parameters shall be referred to as a "provider". Further, the processing illustrated in FIG. 4 starts when a setting button at a terminal that is the receiver is operated by a user.

After processing starts, the search signal transmitting unit 205 of the receiver transmits the Probe_Request signal (S401).

Thereafter, the search signal receiving unit 206 of the receiver waits for the provider to transmit a Probe_Request signal that carries additional information signifying automatic setting of communication parameters (S402). If the Probe_Response signal carrying additional information signifying automatic setting of communication parameters is not received upon elapse of a fixed period of time, then the search signal receiving unit 206 repeats the transmission of the Probe_Request signal.

If the Probe_Response signal is received, the network specifying unit 21 of the receiver specifies, based upon the information contained in the Probe_Response signal, the network identifier of the network in which the provider is participating (S403).

When the network identifier is specified, the network joining unit 210 of the receiver joins the network in which the provider is participating (S404).

After the network is joined, the communication parameter receiving unit 212 of the receiver transmits a message indicative of start of automatic setting of communication parameters and receives communication parameters provided by the provider that has received the message (S405).

Figure 5:
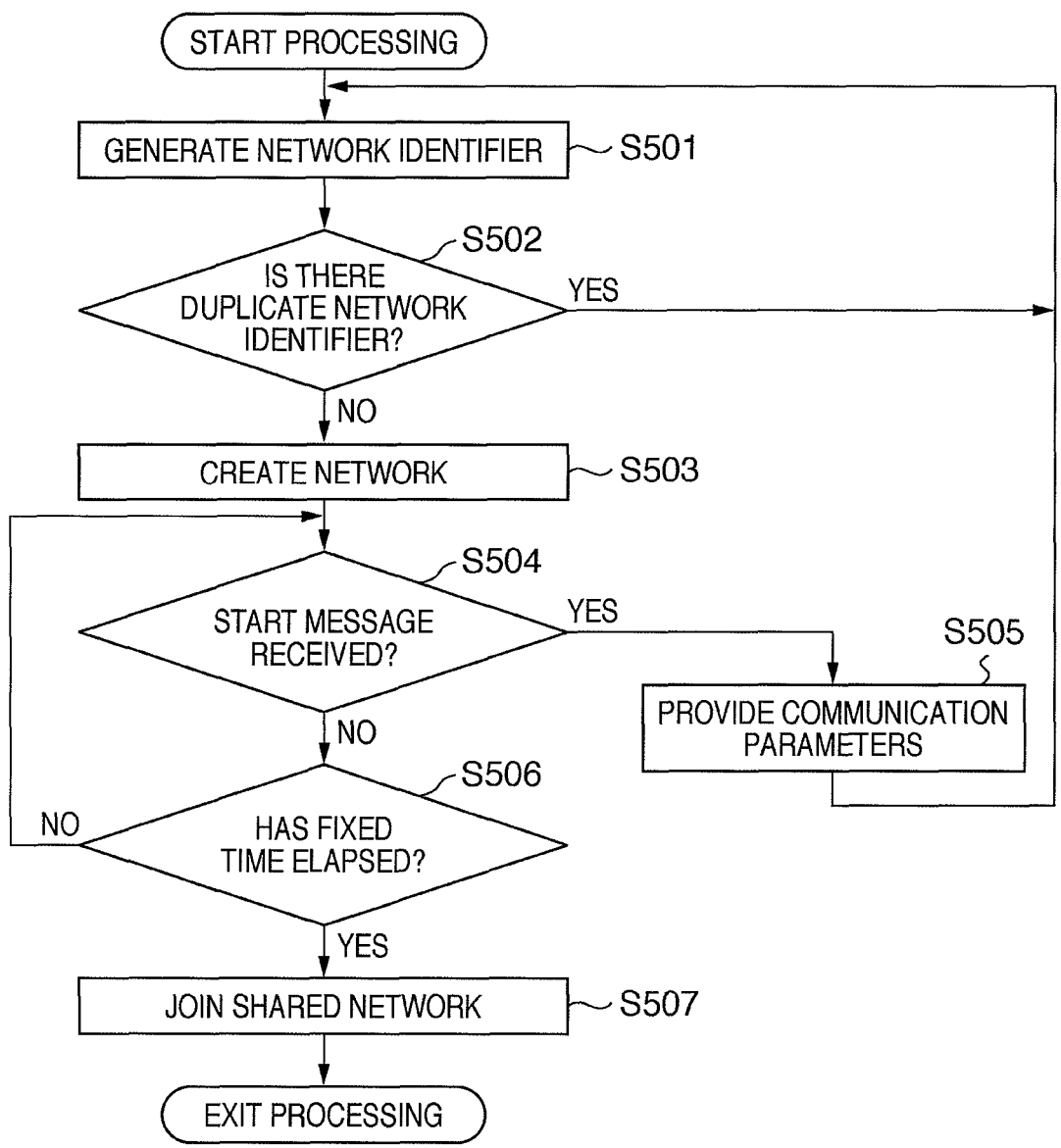
FIG. 5 is a flowchart illustrating operation of a communication-parameter provider in an embodiment.

FIG. 5 is an operation flowchart for describing processing executed when a provider provides communication parameters to a receiver by processing for automatic setting of communication parameters. The processing illustrated in FIG. 5 starts when a setting button at a terminal that is the provider is operated by a user.

The network identifier generating unit 207 of the provider generates a network identifier that includes a random character string (S501). Owing to the inclusion of the random character string, the network identifier generating unit 207 generates a network identifier that is unique among network identifiers set for networks that exist in the vicinity. It should be noted that instead of utilizing a random character string as the network identifier at step S501, the network identifier generating unit 207 may use provider-specific information such as a MAC address. A network identifier that is unique among network identifiers set for networks that exist in the vicinity may be generated similarly by methods other than these.

Next, using the duplicate checking unit 208, the provider makes sure that the generated network identifier is not a duplicate of an identifier of a network existing in the vicinity (S502). In other words, the provider broadcasts a Probe_Request signal to the surroundings and determines whether a Probe_Response signal, which is a signal that is a response to the Probe_Request signal, is sent back. If a Probe_Response signal has been sent back, the provider checks the content thereof to thereby determine whether the generated network identifier duplicates that of a network in the vicinity (S502).

If the result of the check is that a network for which a duplicate network identifier has been set exists, control returns to step S501 and the provider generates a network identifier again.

If a network for which a duplicate network identifier has been set does not exist, then the network creating unit 209 of the provider creates the network for which the network identifier has been generated (S503). It should be noted that if the Probe_Response signal is not sent back, a determination is rendered to the effect that the generated network identifier is not a duplicate of that of a network in the vicinity.

If the search signal receiving unit 206 of the provider receives the Probe_Request signal after the network is created, then the search signal transmitting unit 205 sends back a Probe_Request signal that carries additional information signifying the automatic setting of communication parameters.

Thereafter, the automatic setting control unit 214 waits a fixed period of time for the receiver to transmit a message indicative of start of automatic setting of communication parameters (S504, S506).

Upon receiving the message indicative of start of automatic setting of communication parameters, the automatic setting control unit 214 provides the receiver with communication parameters by means of the communication parameter providing unit 213 (S505). After the communication parameters are provided, the provider returns control to S501 and repeats the processing for providing communication parameters.

If a fixed period of time elapses without receipt of the message indicative of start of automatic setting of communication parameters, then the common network is joined (S507) and processing is exited.

It should be noted that it may be so arranged that an upper-limit value on the number of times communication parameters are provided (namely an upper-limit value on the number of receivers) is set in the storage unit 103 and the processing of FIG. 5 is exited when the provision of communication parameters is performed the number of times set as the upper-limit value, by way of example. In other words, the processing of FIG. 5 may be exited when communication parameters have been provided to receivers, the number of which has been set beforehand as the upper-limit value. In this case, the communication parameter providing unit 213 increments the provision count whenever communication parameters are provided to a receiver, and the processing of FIG. 5 ends when the number of times communication parameters have been provided reaches the upper-limit value.

Figure 6:
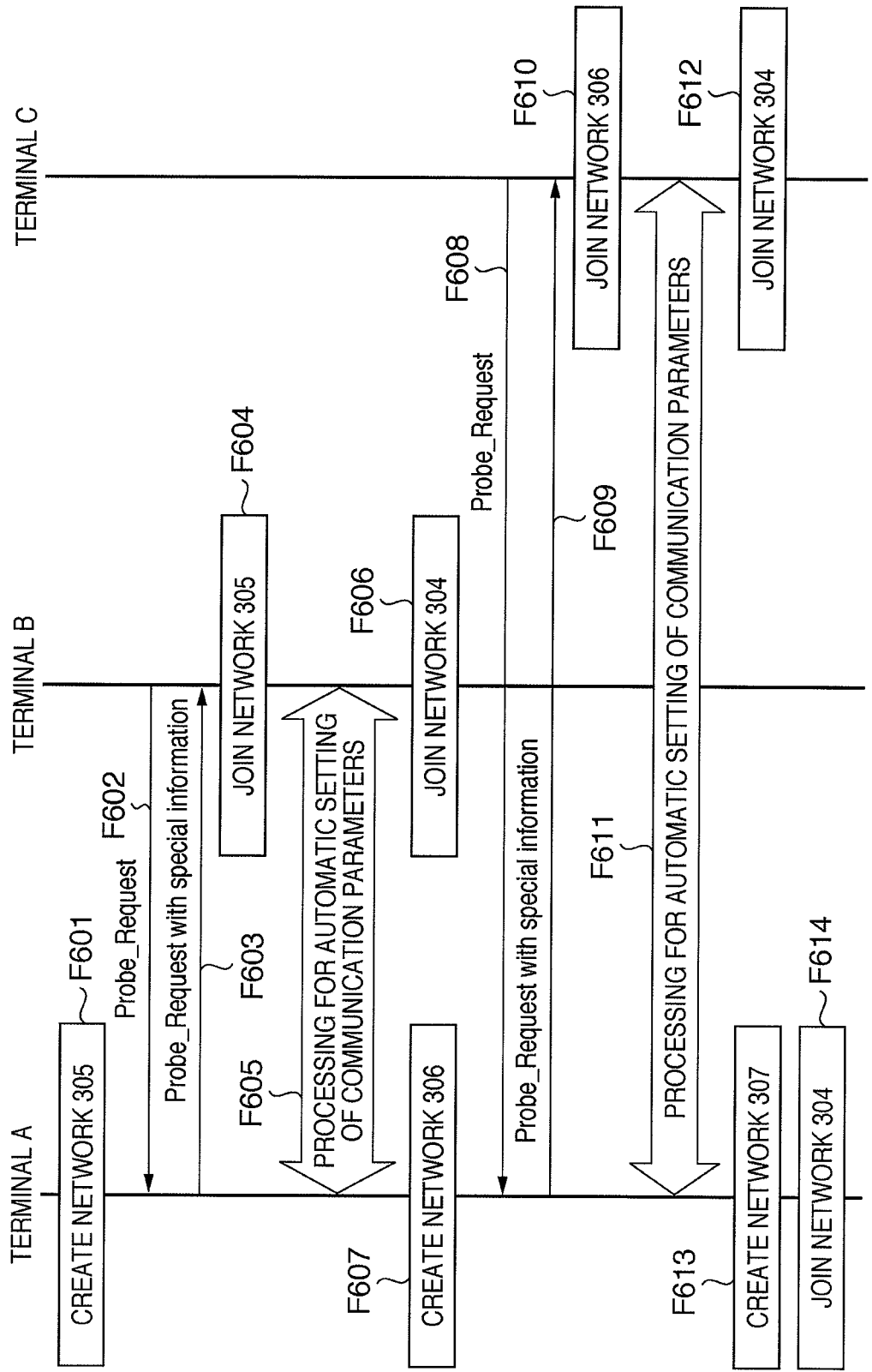
FIG. 6 is a sequence diagram illustrating operation of terminals A, B and C in an embodiment.

FIG. 6 is a sequence diagram regarding processing by which terminals B and C receive the communication parameters of the shared network 304 from terminal A and join the shared network 304.

When the setting button of terminal A is operated by the user, terminal A starts the processing of FIG. 5. When terminal A starts processing, terminal A creates the network 305 for which a network identifier that is unique at least among network identifiers of networks that exist in the vicinity has been set (F601).

When the setting button of terminal B is operated by the user, terminal B starts the processing of FIG. 4 and transmits a Probe_Request signal (F602) and searches for a provider.

Upon receiving the Probe_Request signal transmitted at F602, terminal A sends back a Probe_Response signal to which has been appended an identifier indicating that it has a function for automatic setting of communication parameters (F603).

Upon receiving the Probe_Response signal to which has been appended the identifier indicating possession of the function for automatic setting of communication parameters, terminal B detects and specifies the network 305 that has been created by terminal A and joins this network (F604).

On the network 305, terminal A provides terminal B with the communication parameters of the shared network 304 by automatic setting of the communication parameters (F605).

After the communication parameters are received, terminal B joins the shared network 304 (F606).

After the communication parameters are provided to terminal B, terminal A creates the network 306 for which a network identifier that is unique at least among network identifiers of networks that exist in the vicinity has been set (F607).

When the setting button of terminal C is operated by the user, terminal C starts the processing of FIG. 4. Terminal C then transmits a Probe_Request signal (F608) and searches for a provider.

Upon receiving the Probe_Request signal transmitted at F608, terminal A sends back a Probe_Response signal to which has been appended an identifier indicating that it has a function for automatic setting of communication parameters (F609).

Upon receiving the Probe_Response signal to which has been appended the identifier indicating possession of the function for automatic setting of communication parameters, terminal C detects and specifies the network 306 that has been created by terminal A and joins this network (F610).

On the network 306, terminal A provides terminal C with the communication parameters of the shared network 304 by automatic setting of the communication parameters (F611).

After the communication parameters are received, terminal C joins the shared network 304 (F612).

After the communication parameters are provided to terminal C, terminal A creates the network 307 for which a network identifier that is unique at least among network identifiers of networks that exist in the vicinity has been set (F613).

If a fixed period of time elapses without receipt of the message indicative of start of automatic setting of communication parameters, then terminal A ends processing and joins (returns to) the shared network 304 (S614).

Thus, when a provider provides a receiver with communication parameters, the provider creates a network having a network identifier that is unique among networks that exist in the vicinity. That is, when a receiver detects the network of a provider, only the provider exists in the network in which the provider is participating. This makes it possible for the provider to respond reliably to a Probe_Request signal that is transmitted by the receiver. By adopting this arrangement, even if a network is one (an ad-hoc network) on which it is difficult to specify a provider, a receiver can find and determine the provider easily and quickly. Accordingly, the automatic setting of communication parameters for the purpose of providing and receiving communication parameters can be performed efficiently and with ease.

Although the preferred embodiments of the present invention have been described above, they are merely examples for explaining the present invention, and are not intended to limit the scope of the present invention. Various modifications can be made to the embodiments without departing from the spirit and scope of the present invention.

For example, in the above explanation of the embodiments, Probe_Request and Probe_Response signals are used. However, signals to be transmitted are not limited to them, and other signals playing the same roles may be used.

An IEEE802.11 wireless LAN has been explained as an example. The present invention may, however, be implemented in another wireless medium such as wireless USB, MBOA, Bluetooth®, UWB (Ultra Wide Band), or ZigBee. The present invention may also be implemented in a wired communication medium such as a wired LAN.

Note that MBOA is an abbreviation for Multi Band OFDM Alliance. UWB includes wireless USB, wireless 1394, and WINET.

Although a network identifier, encryption method, encryption key, authentication method, and authentication key are used as examples of communication parameters, another information may be used and also included in communication parameters.

In the present invention, a storage medium which stores software program codes for implementing the above-described functions may be supplied to a system or apparatus, and the computer (or the CPU or MPU) of the system or apparatus may read out and execute the program codes stored in the storage medium. In this case, the program codes read out from the storage medium implement the functions of the above-described embodiments, and the storage medium which stores the program codes constitutes the present invention.

The storage medium for supplying the program codes includes a flexible disk, hard disk, optical disk, magnetooptical disk, CD-ROM, CD-R, magnetic tape, nonvolatile memory card, ROM, and DVD.

The above-described functions are implemented when the computer executes the readout program codes. Also, the above-described functions may be implemented when an OS running on the computer performs some or all of actual processes on the basis of the instructions of the program codes. OS is an abbreviation for Operating System.

Furthermore, the above-described functions may be implemented when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-219921, filed Aug. 27, 2007, which is hereby incorporated by reference herein in its entirety.

The invention claimed is:

1. A communication apparatus comprising:
a joining unit which joins a first shared network;
a receiving unit which receives an instruction for starting a process for setting communication parameters with another communication apparatus to enable the another communication apparatus to set up communications with the first shared network;
wherein the setting up communication parameters comprises:
a creating unit which, upon receiving the instruction for starting a process for setting communication parameters, creates a second network; and
a providing unit which, upon receiving a request from another communication apparatus to join the second network during execution of the process for setting communication parameters, provides communication parameters,
wherein the another communication apparatus joins the first shared network using the communication parameters,
wherein the communication apparatus ends the second network created by said creating unit and returns to the first network if a fixed period of time elapses without receiving the request from another communication apparatus, and
wherein the first shared network or second network comprises a wired or wireless LAN, Zigbee, Bluetooth, or UWB (Ultra Wide Band) network.

2. The apparatus according to claim 1, further comprising a generating unit that generates a network identifier,
wherein said creating unit creates the second network having the network identifier generated by said generating unit.

3. The apparatus according to claim 2, further comprising a determination unit which determines whether there is a network having the network identifier generated by said generating unit in the vicinity,
wherein said creating unit creates the second network having the network identifier generated by said generating unit based on a determination result by said determination unit.

4. The apparatus according to claim 1, wherein, if communication parameters have been provided to a predetermined number of other communication apparatuses, then the communication apparatus joins the first network.

5. The apparatus according to claim 1, wherein said communication parameters are communication parameters used in a wired or wireless LAN, Zigbee, Bluetooth, or UWB (Ultra Wide Band) network.

6. The apparatus according to claim 1, wherein said communication parameters comprise at least one of a network identifier, encryption method, encryption key, authentication method, and authentication key.

7. A communication method of a communication apparatus, comprising:
joining a first shared network;
receiving an instruction for starting a process for setting communication parameters with another communication apparatus to enable the another communication apparatus to set up communications with the first shared network;
wherein the setting up communication parameters comprises:
creating, upon receiving the instruction for starting a process for setting communication parameters, a second network, wherein the second network is created by the communication apparatus; and
providing, upon receiving a request from another communication apparatus to join the second network, during execution of the process for setting communication parameters, communication parameters,
wherein the another communication apparatus joins the first shared network using the communication parameters,
wherein the communication apparatus ends the second network created by the communication apparatus and returns to the first network if a fixed period of time elapses without receiving the request from another communication apparatus, and
wherein the first shared network or second network comprises a wired or wireless LAN, Zigbee, Bluetooth, or UWB (Ultra Wide Band) network.

8. A non-transitory computer-readable storage medium storing a computer program for causing a communication apparatus to execute the communication method set forth in claim 7.

* * * * *